United States Patent
Brown et al.

(10) Patent No.: US 11,453,197 B2
(45) Date of Patent: Sep. 27, 2022

(54) ANTIMICROBIAL SURFACES FOR FLOW PATH COMPONENTS

(71) Applicant: Hamilton Sundstrand Corporation, Charlotte, NC (US)

(72) Inventors: Ricardo O. Brown, West Hartford, CT (US); Steven Poteet, Hamden, CT (US); Blair A. Smith, South Windsor, CT (US); Callie Lynn Benson, Brooklyn, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 114 days.

(21) Appl. No.: 16/026,205

(22) Filed: Jul. 3, 2018

(65) Prior Publication Data

US 2020/0009826 A1  Jan. 9, 2020

(51) Int. Cl.
*B32B 5/16* (2006.01)
*B29C 64/118* (2017.01)
(Continued)

(52) U.S. Cl.
CPC .............. *B32B 5/16* (2013.01); *B29C 64/118* (2017.08); *B32B 5/142* (2013.01); *B32B 7/12* (2013.01); *B64D 13/06* (2013.01); *B29K 2305/14* (2013.01); *B29L 2031/18* (2013.01); *B32B 2260/025* (2013.01); *B32B 2264/102* (2013.01); *B32B 2264/105* (2013.01); *B32B 2307/7145* (2013.01); *B32B 2307/73* (2013.01); *B32B 2311/08* (2013.01); *B32B 2605/18* (2013.01);
(Continued)

(58) Field of Classification Search
CPC .. B32B 5/16; B32B 5/142; B32B 7/12; B32B 2605/18; B32B 2307/7145; B32B 2307/73; B32B 2264/102; B32B 2264/105; B32B 2311/08; B32B 2260/025; B32B 19/041; B29C 64/118; B64D 13/06; B82Y 30/00; B29L 2031/18; B29K 2305/14; B33Y 70/00
USPC ........................................................ 454/76
See application file for complete search history.

(56) References Cited

U.S. PATENT DOCUMENTS 8,347,647 B2   1/2013   McAuliffe et al.
8,852,689 B2 * 10/2014  Srinivas ................. C08J 7/02
                                                 427/307
(Continued)

FOREIGN PATENT DOCUMENTS

CN   10722818 A      6/2010
CN   101839591       9/2010
EP   2236974 A2     10/2010

OTHER PUBLICATIONS

ESpaceNet Translation of Description: Jianning Liu, "Air conditioning system of automobile", Jun. 9, 2010, CN-101722818-A, Web. <www.espacenet.com> Feb. 4, 2020 (Year: 2010).*

(Continued)

*Primary Examiner* — Allen R. B. Schult
(74) *Attorney, Agent, or Firm* — Cantor Colburn LLP (57) ABSTRACT

According to an aspect, a flow path component includes a flow path component body having a flow surface. The flow path component also includes a plurality of antimicrobial nanoparticles embedded in the flow surface and at least partially exposed external to the flow surface to provide an antimicrobial surface.

19 Claims, 5 Drawing Sheets

(51) Int. Cl.
  *B32B 5/14* (2006.01)
  *B32B 7/12* (2006.01)
  *B64D 13/06* (2006.01)
  *B33Y 30/00* (2015.01)
  *B33Y 70/00* (2020.01)
  *B33Y 80/00* (2015.01)
  *B82Y 30/00* (2011.01)
  *B29K 305/08* (2006.01)
  *B29L 31/18* (2006.01)

(52) U.S. Cl.
  CPC .............. *B33Y 30/00* (2014.12); *B33Y 70/00* (2014.12); *B33Y 80/00* (2014.12); *B82Y 30/00* (2013.01)

(56) References Cited

U.S. PATENT DOCUMENTS

| | | | |
|---|---|---|---|
| 10,371,452 B2 * | 8/2019 | Veilleux, Jr. | ............ F28F 9/013 |
| 10,406,263 B2 | 9/2019 | Petrak et al. | |
| 2004/0121077 A1 * | 6/2004 | Park | ........................ C23C 30/00 |
| | | | 427/383.1 |
| 2005/0191355 A1 * | 9/2005 | Foss | ........................ B32B 15/08 |
| | | | 424/486 |
| 2006/0141015 A1 | 6/2006 | Tessier et al. | |
| 2010/0068236 A1 * | 3/2010 | Peltz | ...................... A01N 25/34 |
| | | | 424/405 |
| 2011/0171373 A1 | 7/2011 | Lee et al. | |
| 2015/8029028 | 10/2015 | Petrak et al. | |
| 2019/0010335 A1 * | 1/2019 | Bovero | .................... B05D 5/08 |

OTHER PUBLICATIONS

EP Application No. 19183902.6 Extended EP Search Report dated Nov. 6, 2019, 7 pages.
EP Application No. 19183902.6 Office Action dated Jun. 22, 2021, 4 pages.

* cited by examiner

ANTIMICROBIAL SURFACES FOR FLOW PATH COMPONENTS

BACKGROUND

The subject matter disclosed herein generally relates to the field of air conditioning components, and more particularly to a method and apparatus for manufacturing flow path components with antimicrobial surfaces for an air conditioning system for an aircraft.

Air in an aircraft cabin can contain bacteria exerted from passengers and the environment. Current systems are designed to recycle air from the aircraft cabin; however, bacteria are reemitted into the cabin, whereby passengers can continue to be exposed. Traditional metallic heat exchangers and layup composite structures that makeup the ductwork of an aircraft air conditioning system cannot be readily modified to eliminate buildup and reentry of bacteria.

BRIEF SUMMARY

According to one embodiment, a flow path component is provided. The flow path component includes a flow path component body having a flow surface. The flow path component also includes a plurality of antimicrobial nanoparticles embedded in the flow surface and at least partially exposed external to the flow surface.

In addition to one or more of the features described above, or as an alternative, further embodiments may include where the antimicrobial nanoparticles include one or more of silver and silver oxide nanoparticles.

In addition to one or more of the features described above, or as an alternative, further embodiments may include where the flow path component body is composed of a non-metallic material.

In addition to one or more of the features described above, or as an alternative, further embodiments may include where the flow surface includes a hydrophobic surface containing the antimicrobial nanoparticles.

In addition to one or more of the features described above, or as an alternative, further embodiments may include where the antimicrobial nanoparticles form a nanoscale texturing on the flow surface.

In addition to one or more of the features described above, or as an alternative, further embodiments may include where the antimicrobial nanoparticles embedded in the flow surface are bonded to the flow path component body by an adhesive material.

According to an embodiment, an air conditioning system for an aircraft includes an air cycle machine and a heat exchanger operably coupled to the air cycle machine. The heat exchanger includes at least one flow path component including a flow path component body having a flow surface. A plurality of antimicrobial nanoparticles are embedded in the flow surface and at least partially exposed external to the flow surface.

According to an embodiment, a method of manufacturing a flow path component includes performing an additive manufacturing process to form a flow path component including a flow path component body with a flow surface. The method also includes embedding a plurality of antimicrobial nanoparticles in the flow surface such that the antimicrobial nanoparticles are at least partially exposed external to the flow surface.

In addition to one or more of the features described above, or as an alternative, further embodiments may include where embedding the antimicrobial nanoparticles in the flow surface of the flow path component body includes applying the antimicrobial nanoparticles to the flow surface of the flow path component body and thermally or photo-assist curing the flow path component after the antimicrobial nanoparticles are applied.

In addition to one or more of the features described above, or as an alternative, further embodiments may include where applying the antimicrobial nanoparticles to the flow surface of the flow path component body further includes distributing the antimicrobial nanoparticles on the flow surface using a dust-blowing process.

In addition to one or more of the features described above, or as an alternative, further embodiments may include applying an adhesive material on the flow surface of the flow path component body prior to circulating the antimicrobial nanoparticles using the dust-blowing process.

In addition to one or more of the features described above, or as an alternative, further embodiments may include where applying the antimicrobial nanoparticles to the flow surface of the flow path component body further includes applying a hydrophobic surface containing the antimicrobial nanoparticles to the flow surface of the flow path component body.

In addition to one or more of the features described above, or as an alternative, further embodiments may include where the flow path component body is composed of a non-metallic material, the antimicrobial nanoparticles include one or more of silver and silver oxide nanoparticles, and the method further includes forming a nanoscale texturing of the antimicrobial nanoparticles on the flow surface of the flow path component body.

In addition to one or more of the features described above, or as an alternative, further embodiments may include where the additive manufacturing process includes stereo lithography.

In addition to one or more of the features described above, or as an alternative, further embodiments may include where the additive manufacturing process includes fused deposition modelling.

Technical effects of embodiments of the present disclosure include formation of antimicrobial surfaces on flow path components of an air conditioning system of an aircraft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
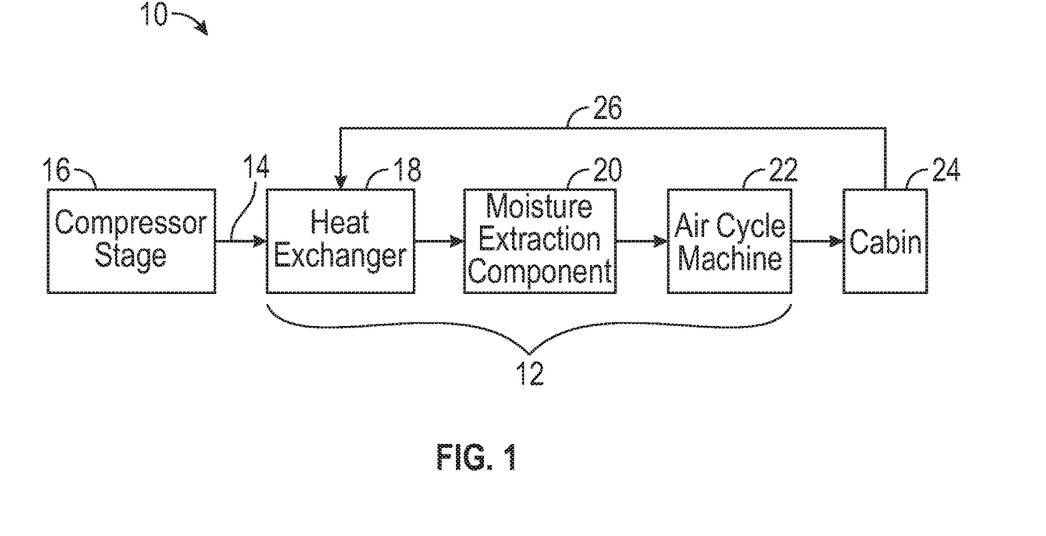
FIG. 1 is a schematic representation of airflow progression through an air conditioning system, according to an embodiment of the present disclosure.

FIG. 1 is a schematic representation of airflow progression 10 through an air conditioning system 12 of an aircraft. It is understood that the air conditioning system 12 is utilized for exemplary purposes and the embodiments disclosed herein may be applied to other systems other than an air conditioning system 12 of an aircraft. The airflow progression 10 is a representation of bleed air 14 as it passes from a compressor stage 16, to an air conditioning system 12 (which includes a heat exchanger 18, moisture extraction component 20, and air cycle machine 22), and onto a cabin 24. FIG. 1 is a simplified schematic representation of the system, highlighting locations of one or more flow path components in the airflow progression 10, which can include ductwork and other components within the airflow progression 10. All elements upstream of the heat exchanger 18 and downstream of the moisture extraction component 20 are not depicted. It should be appreciated that, although particular systems in FIG. 1 are separately defined in the schematic block diagram, each or any of the systems may be otherwise combined or separated via hardware and/or software. For example, the moisture extraction component 20 may be a part of at least one of the compressor stage 16, the heat exchanger 18, the air cycle machine 22, and the cabin 24. A recirculation path 26 can extract air from the cabin 24 to use in combination with the bleed air 14 or in place of bleed air 14, for example, when the bleed air 14 is unavailable or insufficient.

The air conditioning system 12 can be a sub-system of an aircraft engine that conditions bleed air 14 so that bleed air 14 can be re-used to perform an additional function within the aircraft. The bleed air 14 is taken from a compressor stage 16 of the aircraft engine. In other non-limiting embodiment, the bleed air 14 can be compressed air taken from an ambient environment. The compressor stage 16 can be an intermediate or high pressure stage within the aircraft engine. The heat exchanger 18 can be a condenser for condensing moisture from air into droplets. The moisture extraction component 20 can be an elongated tube of solid material with hydrophobic and/or hydrophilic surfaces for extracting moisture from air. The air cycle machine 22 is a component of the air conditioning system 12 for controlling the temperature and pressure of air exiting from the air cycle machine 22 and into cabin 24. The cabin 24 is a compartment of the aircraft for housing passengers and/or equipment.

The compressor stage 16 can be fluidly connected to the heat exchanger 18 via fluid lines or conduits in the aircraft. The heat exchanger 18 can be fluidly connected to the moisture extraction component 20. The moisture extraction component 20 is fluidly connected to the air cycle machine 22, and the air cycle machine 22 is fluidly connected to the cabin 24.

During operation of the aircraft engine, bleed air 14 is drawn from the compressor stage 16 and into the heat exchanger 18 of the air conditioning system 12. The heat exchanger 18 can cool and condense moisture in the bleed air 14 and/or from the recirculation path 26 from vapor into moisture droplets. In some non-limiting embodiments, the heat exchanger 18 can increase or decrease the temperature of air received at the heat exchanger 18. The air with the condensed moisture droplets can then be transported toward the air cycle machine 22. The air cycle machine 22 further conditions the air by altering the temperature and the pressure of the air to a level appropriate for the passengers in the cabin 24. A more detailed example of an aircraft air conditioning system and/or an environment control system can be found in U.S. Pat. No. 8,347,647B2.

Figure 2:
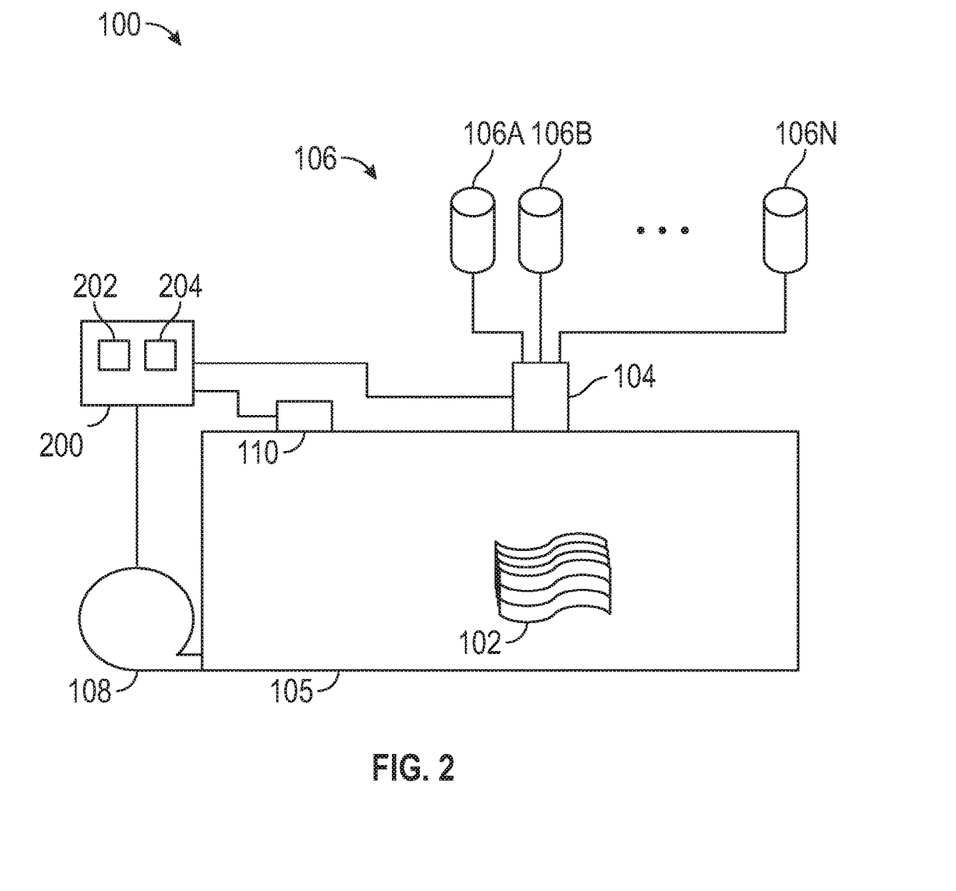
FIG. 2 is a block diagram of an additive manufacturing system for forming a flow path component of the air conditioning system of FIG. 1, according to an embodiment of the present disclosure.

FIG. 2 depicts an example of an additive manufacturing system 100 configured to perform an additive manufacturing process to form a flow path component 102, such as a heat exchanger 18, ducting, or other component of the air conditioning system 12 of FIG. 1. The additive manufacturing system 100 is depicted schematically and can support any type of additive manufacturing processes known in the art. For example, the additive manufacturing system 100 can be configured to support stereo-lithography using photo-polymerization or a fused deposition modelling process using extrusion-type printing to melt raw materials and form a plurality of layers. Other examples can include selective laser sintering, thermoforming, and known additive manufacturing processes.

In the example of FIG. 2, an application apparatus 104 can control the formation of a plurality of layers of the flow path component 102 within a manufacturing chamber 105. The application apparatus 104 can be selected corresponding to the type of additive manufacturing process employed. For example, the application apparatus 104 may include a light emitting device or a laser and lens system for stereo-lithography or can include an extrusion head and nozzles for fused deposition modelling. A plurality of additive manufacturing materials 106 can be selectively formed into the flow path component 102 using the application apparatus 104 and other supporting subsystems, such as temperature and position controls. The additive manufacturing materials 106 can include a plurality of materials 106A, 106B, . . . , 106N used at different manufacturing stages. For example, a base material can be used to form a primary structure of the flow path component 102 as part of a 3-D printing process, for instance, of a non-metallic composite material. Other additive manufacturing materials 106 can include surface coatings, adhesive materials, antimicrobial nanoparticles, and other such materials. The additive manufacturing materials 106 can include any combination of liquid photopolymer, thermoplastic feedstock, powder, paste, and/or other known material types.

Where ultraviolet curing or other curing methods are used as part of the additive manufacturing process, the flow path component 102 may have a tacky surface to enable deposition and partial embedding of antimicrobial nanoparticles to surfaces of the flow path component 102 prior to a final curing stage. If the resulting flow surfaces of the flow path component 102 are not sufficiently tacky to support direct embedding of the antimicrobial nanoparticles to surfaces of the flow path component 102, an adhesive material can be applied to support embedding the antimicrobial nanoparticles in one or more flow surfaces of the flow path component 102. Examples of adhesive materials can include polyurethane, epoxy sealant binder, acrylic, photo-cured resin, and other such materials known in the art.

To support the application of antimicrobial nanoparticles to surfaces of the flow path component 102 during the manufacturing process, a blower 108 can be operably coupled to the manufacturing chamber 105 to create an air vortex, such that release of the antimicrobial nanoparticles from the additive manufacturing materials 106 can be dust-blown onto surfaces of the flow path component 102 prior to final curing of the flow path component 102 by a curing device 110. The dust-blowing process is free of binders or solvents as opposed to typical spray coating applications. The dust-blowing process can result in coating over 95% of unmasked surfaces with the antimicrobial nanoparticles, while exposing surface area of the antimicrobial nanoparticles on flow surfaces of the flow path component 102. The curing device 110 can be a heating element operable to thermally cure the flow path component 102. Alternatively, the curing device 110 can be a light source, such as an ultraviolet light source, operable to perform photo-assist curing of the antimicrobial nanoparticles. In embodiments, prior to final curing, the flow path component 102 may have a tacky or sticky surface that traps the antimicrobial nanoparticles when dust blown using the blower 108 within the manufacturing chamber 105. Depositing the antimicrobial nanoparticles prior to final curing can resulting in embedding the antimicrobial nanoparticles at or substantially near the surface of the flow path component 102, such that the antimicrobial nanoparticles are at least partially exposed external to the surface. In some embodiments, the antimicrobial nanoparticles can be, for example, silver and/or silver oxide nanoparticles operable to disrupt cell functions of bacteria. In addition to the bactericidal properties of the antimicrobial nanoparticles, the dust-blowing process followed by a final curing can result in forming a nanoscale texturing of the antimicrobial nanoparticles on the flow path component 102, where the texturing can also kill or otherwise reduce bacterial adhesion.

A controller 200 can interface with and control multiple elements of the additive manufacturing system 100, such as positions, flow rates, pressures, temperatures, and the like. Process steps, such as deposition and/or curing, can occur within the manufacturing chamber 105 or may be distributed between multiple instances of the manufacturing chamber 105. As an example, the controller 200 can control a deposition recipe and/or provide deposition/light control of the additive manufacturing materials 106 through the application apparatus 104, control airflow out of the blower 108, and control the curing device 110. In an embodiment, the controller 200 includes a memory system 202 to store instructions that are executed by a processing system 204 of the controller 200. The executable instructions may be stored or organized in any manner and at any level of abstraction, such as in connection with a controlling and/or monitoring operation of the additive manufacturing system 100. The processing system 204 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 202 may include random access memory (RAM), read only memory (ROM), or other electronic, optical, magnetic, or any other computer readable medium onto which is stored data and control algorithms in a non-transitory form.

Figure 3:
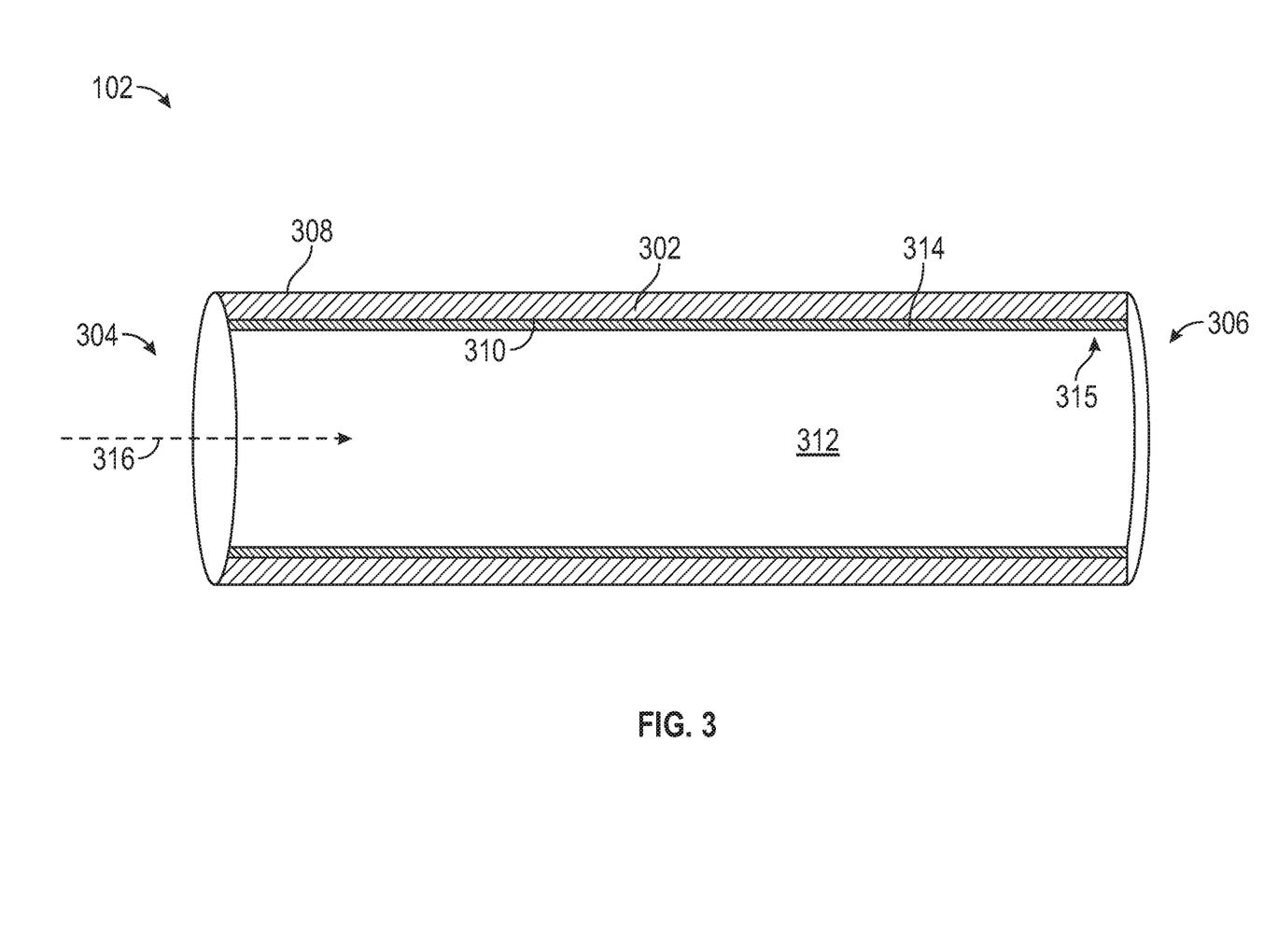
FIG. 3 is a partial sectional view of a portion of a flow path component, according to an embodiment of the present disclosure.

FIG. 3 is a partial cross-sectional view of the flow path component 102 of FIG. 2, according to an embodiment of the present disclosure. Although the example of FIG. 3 depicts a simple tube-like structure for purposes of explanation, it will be understood that the flow path component 102 can include complex features, such as a plurality of flow channels when embodied as the heat exchanger 18 of FIG. 1.

The flow path component 102 can include a flow path component body 302, an inlet 304, an outlet 306, an outer surface 308, an inner surface 310, and a main flow channel 312. The inner surface 310 of the flow path component 102 defines the main flow channel 312, which fluidly connects the inlet 304 to the outlet 306. A plurality of antimicrobial nanoparticles 314 are embedded in the inner surface 310 of the flow path component body 302 by the additive manufacturing system 100 of FIG. 2. In some embodiments, the flow path component body 302 is composed of a non-metallic material, and the antimicrobial nanoparticles 314 can include one or more of: silver and silver oxide nanoparticles. In some embodiments, a coating can be applied to form a hydrophobic surface on the inner surface 310 prior to embedding the antimicrobial nanoparticles 314 in the inner surface 310 of the flow path component body 302, where the inner surface is an example of a flow surface 315. The hydrophobic surface can be composed of a hydrophobic compound configured to repel moisture away from the inner surface 310 of the flow path component body 302. As an air flow 316 propagates through the main flow channel 312, bacteria contacting the antimicrobial nanoparticles 314 in the flow surface 315 can be killed due to the antimicrobial properties of the antimicrobial nanoparticles 314 and/or nanoscale texturing of the antimicrobial nanoparticles 314 on the flow surface 315.

Figure 4:
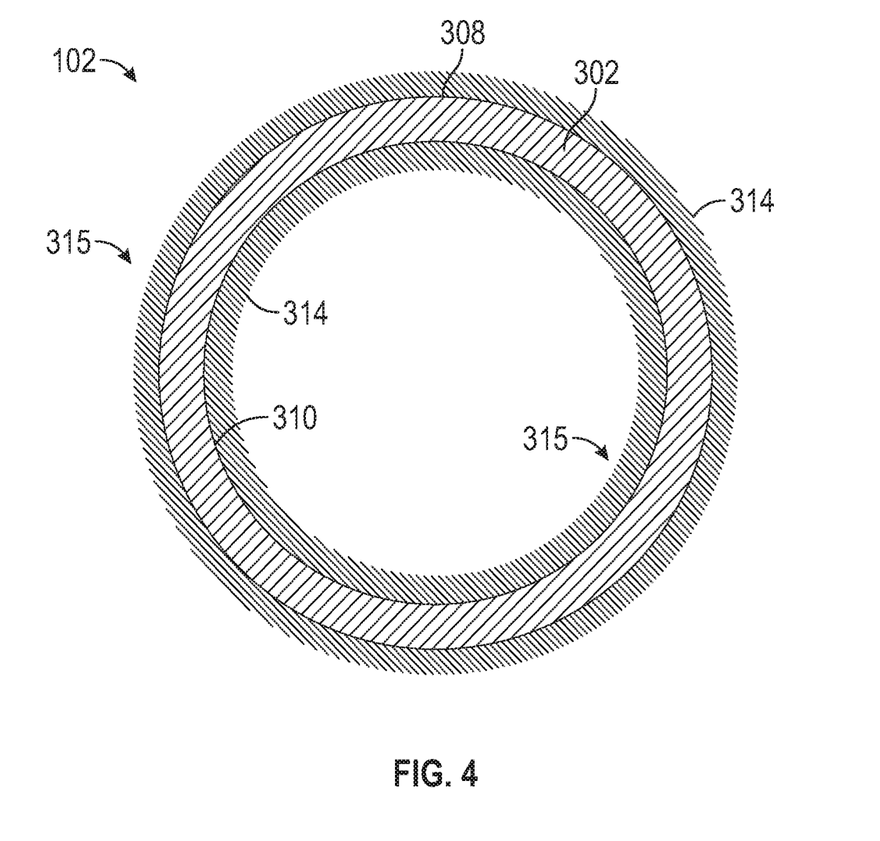
FIG. 4 is a partial sectional view of a portion of a flow path component, according to an embodiment of the present disclosure.
Figure 5:
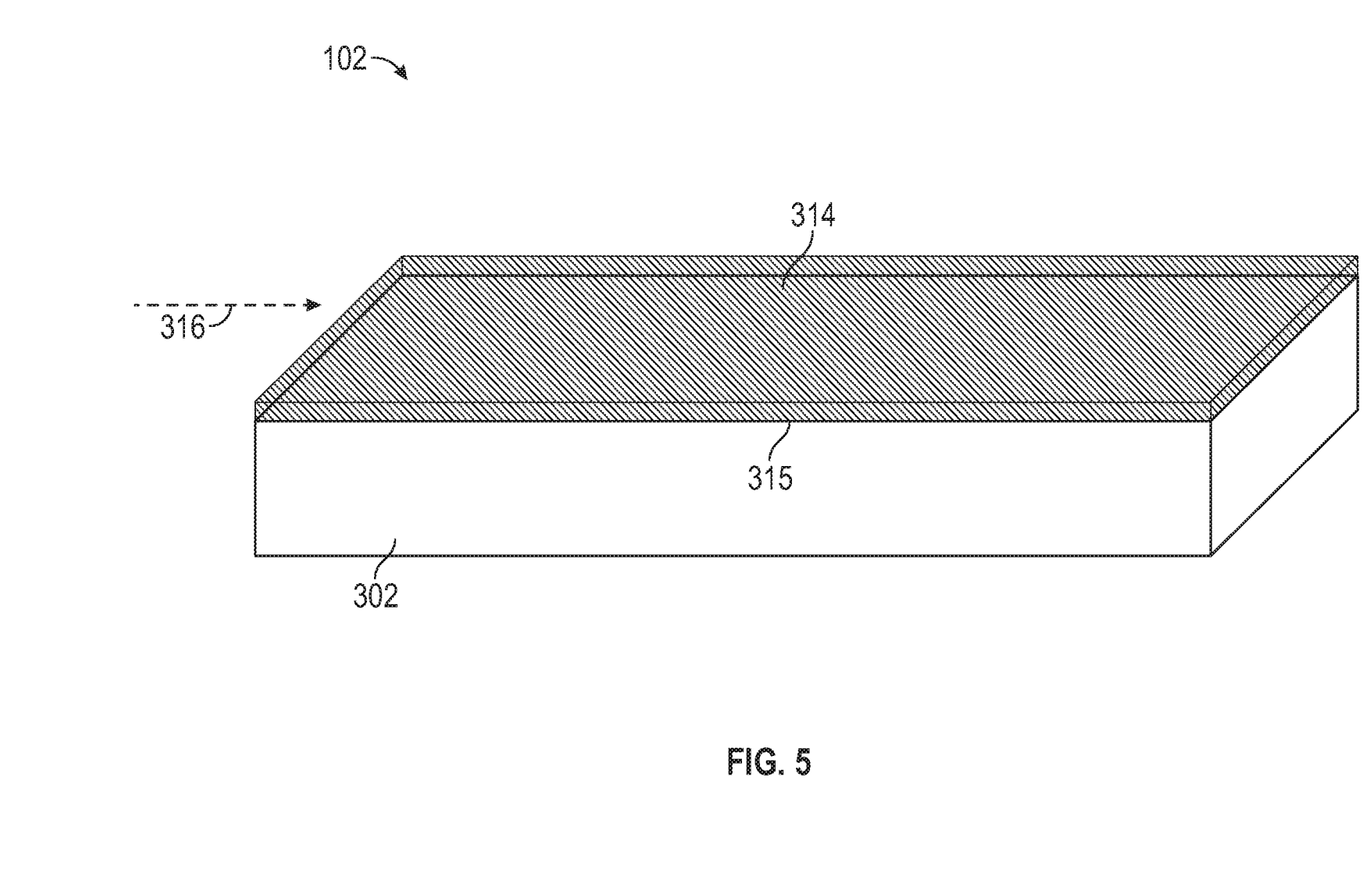
FIG. 5 is a perspective view of a portion of a flow path component, according to an embodiment of the present disclosure.

FIG. 4 depicts a cross section of a portion of the flow path component 102 according to an embodiment where the inner surface 310 and the outer surface 308 of the flow path component body 302 are both a flow surface 315 embedded with antimicrobial nanoparticles 314. Other variations are contemplated beyond annular or tubular structures. For example, as depicted in FIG. 5, the flow surface 315 on the flow path component body 302 can be a substantially planar surface embedded with antimicrobial nanoparticles 314 configured to kill bacteria entrained in air flow 316. Planar configurations may be portions of a larger apparatus, such as a plate-fin embodiment of the heat exchanger 18 of FIG. 1.

Figure 6:
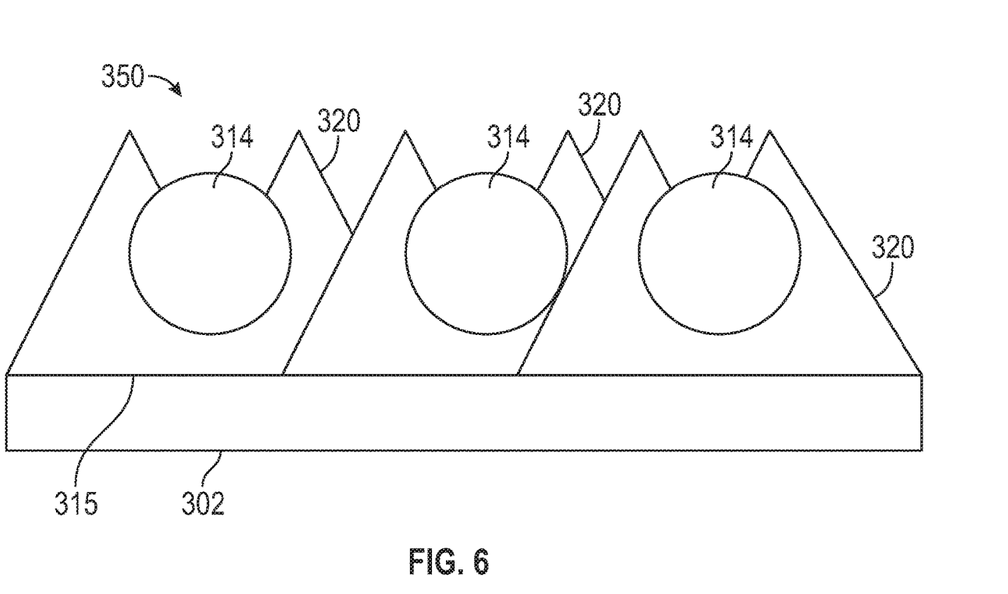
FIG. 6 is a schematic view of nanoscale texturing of a flow surface of a flow path component, according to an embodiment of the present disclosure.

FIG. 6 depicts a simplified schematic view of a portion of nanoscale texturing 350 of the flow surface 315 of flow path component 102, according to an embodiment. The nanoscale texturing 350 can include pointed/sharp substantially conical structures 320 formed in polymer cure material that may perforate microbe cells. Externally exposed surface area of the antimicrobial nanoparticles 314 can also kill microorganisms in combination with the conical structures 320. The conical structures 320 may be formed responsive to the dust-blown impact of the antimicrobial nanoparticles 314 on the flow surface 315 (e.g., where still tacky or an adhesive material is used) prior to final curing in combination with controlling parameters of the final curing process, for instance, by the controller 200 of FIG. 2.

Figure 7:
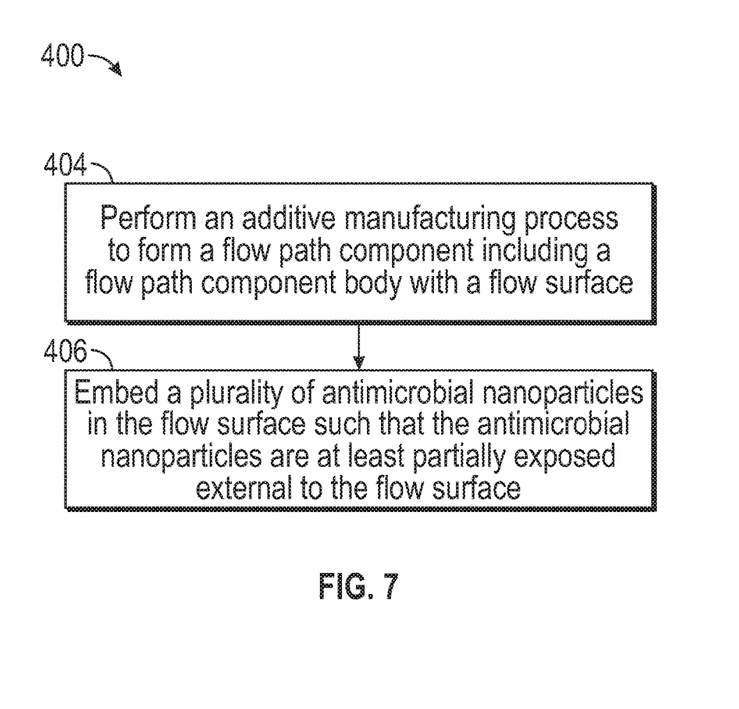
FIG. 7 is a flow diagram of a method of manufacturing a flow path component with an antimicrobial surface, according to an embodiment of the present disclosure.

Referring now to FIG. 7, with continued reference to FIGS. 1-6. FIG. 7 shows a method 400 of manufacturing the flow path component 102 of FIG. 2 according to an embodiment. At block 404, an additive manufacturing process is performed using the additive manufacturing system 100 to form a flow path component 102 including a flow path component body 302 having a flow surface 315.

At block 406, a plurality of antimicrobial nanoparticles 314 is embedded in the flow surface 315 such that the antimicrobial nanoparticles 314 are at least partially exposed external to the flow surface 315. Embedding the antimicrobial nanoparticles 314 in the flow surface 315 of the flow path component body 302 can include applying the antimicrobial nanoparticles 314 to the flow surface 315 of the flow path component body 302 using the application apparatus 104 of the additive manufacturing system 100 and thermally or photo-assist curing the flow path component 102 using the curing device 110 after the antimicrobial nanoparticles 314 are applied from the additive manufacturing materials 106. Applying the antimicrobial nanoparticles 314 to the flow surface 315 of the flow path component body 302 can include distributing the antimicrobial nanoparticles 314 on the flow surface 315 using a dust-blowing process with the blower 108. In some embodiments, an adhesive material can be applied on the flow surface 315 of the flow path component body 302 prior to circulating the antimicrobial nanoparticles 314 using the dust-blowing process, for example, to further enhance adhesion prior to final curing. In some embodiments, applying the antimicrobial nanoparticles 314 to the flow surface 315 of the flow path component body 302 can include applying a hydrophobic surface containing the antimicrobial nanoparticles 314 to the flow surface 315 of the flow path component body 302.

While the above description has described the flow process of FIG. 7 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flow path component of an airflow progression between bleed air extracted from a compressor stage of an aircraft engine through an aircraft air conditioning system to a cabin of an aircraft, the flow path component comprising:
 a flow path component body comprising a flow surface, the flow surface configured to be exposed to an air flow within a flow channel between an inlet and an outlet of the flow path component in the aircraft; and
 a plurality of antimicrobial nanoparticles embedded in the flow surface and at least partially exposed external to the flow surface within the flow channel forming a nanoscale texturing on the flow surface, the nanoscale texturing comprising a combination of the antimicrobial nanoparticles embedded in the flow surface and a plurality of substantially conical structures formed of polymer cure material between the antimicrobial nanoparticles, the substantially conical structures having pointed tips configured to perforate microbe cells between the antimicrobial nanoparticles embedded within the flow surface.

2. The flow path component of claim 1, wherein the antimicrobial nanoparticles comprise one or more of silver and silver oxide nanoparticles.

3. The flow path component of claim 1, wherein the flow path component body is composed of a non-metallic material.

4. The flow path component of claim 1, wherein the flow surface comprises a hydrophobic surface containing the antimicrobial nanoparticles.

5. The flow path component of claim 1, wherein the antimicrobial nanoparticles embedded in the flow surface are bonded to the flow path component body by an adhesive material.

6. The flow path component of claim 1, wherein the flow path component is a component of a recirculation path of the aircraft air conditioning system, the recirculation path configured to extract cabin air from the aircraft to use in combination with bleed air from the aircraft engine or in place of the bleed air when the bleed air is unavailable or insufficient.

7. An air conditioning system of an airflow progression between bleed air extracted from a compressor stage of an aircraft engine to a cabin of for an aircraft, the air conditioning system comprising:
 an air cycle machine of the aircraft, wherein the air cycle machine is configured to alter a temperature and a pressure of air in the air conditioning system; and
 a heat exchanger of the aircraft operably coupled to the air cycle machine, the heat exchanger comprising at least one flow path component comprising:
 a flow path component body comprising a flow surface, the flow surface configured to be exposed to an air flow within a flow channel between an inlet and an outlet of the at least one flow path component; and
 a plurality of antimicrobial nanoparticles embedded in the flow surface and at least partially exposed external to the flow surface within the flow channel forming a nanoscale texturing on the flow surface, the nanoscale texturing comprising a combination of the antimicrobial nanoparticles embedded in the flow surface and a plurality of substantially conical structures formed of polymer cure material between the antimicrobial nanoparticles, the substantially conical structures having pointed tips configured to perforate microbe cells between the antimicrobial nanoparticles embedded within the flow surface.

8. The air conditioning system of claim 7, wherein the antimicrobial nanoparticles comprise one or more of silver and silver oxide nanoparticles.

9. The air conditioning system of claim 7, wherein the flow path component body is composed of a non-metallic material.

10. The air conditioning system of claim 7, wherein the flow surface comprises a hydrophobic surface containing the antimicrobial nanoparticles.

11. The air conditioning system of claim 7, wherein the antimicrobial nanoparticles embedded in the flow surface are bonded to the flow path component body by an adhesive material.

12. A method of manufacturing a flow path component of an airflow progression between bleed air extracted from a compressor stage of an aircraft engine through an aircraft air conditioning system to a cabin of for an aircraft, the method comprising:
performing an additive manufacturing process to form the flow path component comprising a flow path component body with a flow surface, the flow surface configured to be exposed to an air flow within a flow channel between an inlet and an outlet of the flow path component of the aircraft; and
embedding a plurality of antimicrobial nanoparticles in the flow surface such that the antimicrobial nanoparticles are at least partially exposed external to the flow surface within the flow channel and form a nanoscale texturing on the flow surface, the nanoscale texturing comprising a combination of the antimicrobial nanoparticles embedded in the flow surface and a plurality of substantially conical structures formed of polymer cure material between the antimicrobial nanoparticles, the substantially conical structures having pointed tips configured to perforate microbe cells between the antimicrobial nanoparticles embedded within the flow surface.

13. The method of claim 12, wherein embedding the antimicrobial nanoparticles in the flow surface of the flow path component body comprises:
applying the antimicrobial nanoparticles to the flow surface of the flow path component body; and
thermally or photo-assist curing the flow path component after the antimicrobial nanoparticles are applied.

14. The method of claim 13, wherein applying the antimicrobial nanoparticles to the flow surface of the flow path component body further comprises distributing the antimicrobial nanoparticles on the flow surface using a dust-blowing process.

15. The method of claim 14, further comprising:
applying an adhesive material on the flow surface of the flow path component body prior to circulating the antimicrobial nanoparticles using the dust-blowing process.

16. The method of claim 13, wherein applying the antimicrobial nanoparticles to the flow surface of the flow path component body further comprises applying a hydrophobic surface containing the antimicrobial nanoparticles to the flow surface of the flow path component body.

17. The method of claim 12, wherein the flow path component body is composed of a non-metallic material, the antimicrobial nanoparticles comprise one or more of silver and silver oxide nanoparticles.

18. The method of claim 12, wherein the additive manufacturing process comprises stereo lithography.

19. The method of claim 12, wherein the additive manufacturing process comprises fused deposition modelling.

* * * * *